United States Patent
Rodriguez

(10) Patent No.: US 12,244,609 B2
(45) Date of Patent: Mar. 4, 2025

(54) METHODS AND SYSTEMS FOR DETERMINING THE AUTHENTICITY OF AN IDENTITY DOCUMENT

(71) Applicant: Raphael A. Rodriguez, Marco Island, FL (US)

(72) Inventor: Raphael A. Rodriguez, Marco Island, FL (US)

( * ) Notice: Subject to any disclaimer, the term of this patent is extended or adjusted under 35 U.S.C. 154(b) by 0 days.

(21) Appl. No.: 18/168,954

(22) Filed: Feb. 14, 2023

(65) Prior Publication Data
US 2024/0275795 A1   Aug. 15, 2024

(51) Int. Cl.
*G06V 30/40*   (2022.01)
*G06V 30/416*   (2022.01)
(Continued)

(52) U.S. Cl.
CPC .......... *H04L 63/126* (2013.01); *G06V 30/416* (2022.01); *G06V 30/418* (2022.01);
(Continued)

(58) Field of Classification Search
None
See application file for complete search history.

(56) References Cited

U.S. PATENT DOCUMENTS 5,758,314 A   5/1998   McKenna
5,819,251 A   10/1998   Kremer et al.
(Continued)

FOREIGN PATENT DOCUMENTS

CN   106650261   5/2017
CN   109963022   7/2019
(Continued)

OTHER PUBLICATIONS

Repici (Domini John Repici, "How To; Understanding Classic SoundEx Algorithms", found at https://creativyst.com/Doc/Articles/SoundEx1/SoundEx1.shtml, Apr. 2021) (Year: 2021).*
(Continued)

*Primary Examiner* — Piotr Poltorak
(74) *Attorney, Agent, or Firm* — Kevin McDermott, Esq.

(57) ABSTRACT

The present disclosure provides a method for determining the authenticity of an identity document that includes receiving, by an electronic device, an image of an identity document. The document image includes facial image data and personal data of a person associated with the identity document and an identity document number. Moreover, the method includes extracting the personal data and the document number from the identity document image. The extracted personal data includes at least a surname and the extracted identity document number includes groups of characters that represent personal data and information about an entity. Furthermore, the method includes decoding a first group of the characters using a soundex coding algorithm, identifying a surname that corresponds to the decoded first group of characters, comparing the identified surname against the surname in the extracted personal data, and determining the authenticity of the identity document using a result of the comparison.

20 Claims, 5 Drawing Sheets

(51) Int. Cl.
*G06V 30/418* (2022.01)
*G06V 30/42* (2022.01)
*G06V 40/16* (2022.01)
*H04L 9/40* (2022.01)

(52) U.S. Cl.
CPC ............ *G06V 30/42* (2022.01); *G06V 40/172* (2022.01); *H04L 63/0861* (2013.01); *H04L 63/123* (2013.01)

(56) References Cited

U.S. PATENT DOCUMENTS

| | | | |
|---|---|---|---|
| 6,026,398 | A | 2/2000 | Brown et al. |
| 6,157,935 | A | 12/2000 | Tran et al. |
| 6,434,547 | B1 | 8/2002 | Mishelevich et al. |
| 7,403,942 | B1 | 7/2008 | Bayliss |
| 7,657,540 | B1 | 2/2010 | Bayliss |
| 7,694,887 | B2 | 4/2010 | Jones et al. |
| 7,720,846 | B1 | 5/2010 | Bayliss |
| 7,912,842 | B1 | 3/2011 | Bayliss |
| 9,418,078 | B2 | 8/2016 | Ludlow et al. |
| 9,558,366 | B2 | 1/2017 | Spalka et al. |
| 9,613,029 | B2 | 4/2017 | Yang et al. |
| 10,049,192 | B2 | 8/2018 | Barritz et al. |
| 10,079,687 | B2 | 9/2018 | Mishra et al. |
| 10,331,950 | B1 * | 6/2019 | Suriyanarayanan ......................... G06V 30/416 |
| 10,915,748 | B2 | 2/2021 | Suriyanarayanan et al. |
| 11,461,567 | B2 | 10/2022 | Singal et al. |
| 2005/0289182 | A1 * | 12/2005 | Pandian ................. G06Q 10/10 |
| 2010/0306155 | A1 | 12/2010 | Giannetto |
| 2011/0221565 | A1 | 9/2011 | Ludlow et al. |
| 2013/0204880 | A1 | 8/2013 | Lesiecki et al. |
| 2015/0006408 | A1 | 1/2015 | Mak et al. |
| 2015/0341370 | A1 * | 11/2015 | Khan ...................... H04L 63/20 726/30 |
| 2016/0179806 | A1 | 6/2016 | Mortensen et al. |
| 2019/0362169 | A1 * | 11/2019 | Lin ...................... G06V 30/416 |
| 2020/0342222 | A1 * | 10/2020 | Bahloul ................ H04L 9/3247 |
| 2021/0124919 | A1 * | 4/2021 | Balakrishnan ....... G06V 30/418 |
| 2022/0147582 | A1 | 5/2022 | Kim et al. |

FOREIGN PATENT DOCUMENTS

| | | |
|---|---|---|
| EP | 4054145 | 9/2022 |
| WO | WO 02/01460 | 1/2002 |

OTHER PUBLICATIONS

Raghavan (Raghavan et al., "Using Soundex Codes for Indexing Names in ASR documents", DOI:10.3115/1626307.1626312, May 2004) (Year: 2004).*

DiPersio (Christopher DiPersio, "IndicSOUNDEX algorithm for text matching", Workshop on Multilingual Search Web Conference, Apr. 2021). (Year: 2021).*

Sivaji Bandyopadhya, "Detection and Correction of Phonetic Errors with a New Orthographic Dictionary", Computer Science and Engineering Department, Jadavpur University, Calcutta, India, Aug. 15, 2021, found on https://aclanthology.org/Y00-1003.pdf (Year: 2021).*

* cited by examiner

METHODS AND SYSTEMS FOR DETERMINING THE AUTHENTICITY OF AN IDENTITY DOCUMENT

BACKGROUND OF THE INVENTION

This invention relates generally to authenticating identity documents, and more particularly, to methods and systems for determining the authenticity of an identity document.

Individuals conduct transactions with many different service providers in person and remotely over the Internet. Network-based transactions conducted over the Internet may involve, for example, opening a bank account or similar account using a website or mobile application. Service providers typically require successfully identifying an individual before he or she is permitted to open a bank account or conduct any other type of network-based transaction involving sensitive information.

Service providers typically require individuals to upload an image of his or her identity document, like a driver's license or a passport, and a claim of identity to facilitate authentication. The uploaded images are typically analyzed to determine whether the identity document in the uploaded image is authentic, not tampered with, jurisdictionally accurate, and unexpired.

Imposters have been known to impersonate individuals by providing a false claim of identity supported by a fraudulent identity document when attempting to deceive a service provider into concluding the imposter is the person he or she claims to be. Such impersonations are known as spoofing. It is known that some states append check digits to driver's license numbers to protect against spoofing. Check digits are extra digits added to the end of driver's license numbers that can be used to verify numbers and protect against both single-digit errors and transposition errors.

Impostors also have been known to use many methods to obtain or create fraudulent identity documents. For example, imposters have been known to alter identity documents by laminating another person's image onto their own identity document or to change the text of another person's identity document, for instance, the driver's license number. The imposters upload images of the altered documents, for example, when attempting to open a bank account. Such fraudulent identity documents are difficult to detect using known techniques. Consequently, opening a banking account or other type of similar account with an uploaded image of an identity document captured at a remote location depends on verifying the identity document in the uploaded image is authentic.

Known methods for determining the authenticity of an identity document included in an image may analyze various features of the document, for example, the text font, presence of security features, and color spectrum, and may verify the uploaded image was not taken of a photocopy. However, these methods typically do not generate results that satisfy desired accuracy and trustworthiness requirements, are expensive, and can result in compromised security.

Thus, it would be advantageous and an improvement over the relevant technology to provide a method and a computer capable of enhancing the accuracy and trustworthiness of identity document authentication results, enhancing security, and facilitating a reduction in costs incurred due to successful spoofing attacks.

BRIEF DESCRIPTION OF THE INVENTION

An aspect of the present disclosure provides a method for determining the authenticity of an identity document including the steps of receiving, by an electronic device, an image of an identity document. The identity document image includes facial image data and personal data of a person associated with the identity document and an identity document number. The method also includes the step of extracting the personal data and the identity document number from the identity document image. The extracted personal data includes at least a surname, and the extracted identity document number includes groups of characters that represent different items of personal data and information about an entity. Furthermore, the method includes the steps of decoding a first group of the characters using a soundex coding algorithm, identifying a surname that corresponds to the decoded first group of characters, comparing the identified surname against the surname in the extracted personal data, and determining the authenticity of the identity document using a result of the comparison.

In one embodiment of the present disclosure, the determining step includes calculating a matching score based on the comparison, comparing the matching score against a threshold score, and when the matching score satisfies the threshold score, determining the identity document is authentic.

In another embodiment of the present disclosure, the extracted personal data includes the birth date of the person associated with the identity document, and the determining step further includes decoding at least one other group of characters in the extracted identity document number to determine a decoded birth date, comparing the birth date from the extracted personal data against the decoded birth date, determining the identity document is authentic when the birth dates match, and determining the identity document is fraudulent when the birth dates are different.

In yet another embodiment of the present disclosure, the identity document was issued by a trusted entity, and the determining step further includes decoding another group of characters in the extracted identity document number to determine a decoded entity, comparing the decoded entity against the trusted entity, determining the document is authentic when the decoded and trusted entities match, and determining the document is fraudulent when the decoded and trusted entities are different.

In another embodiment of the present disclosure, the determining step further includes determining the identity document is authentic when the identified surname matches the surname in the extracted personal data, and determining the identity document is fraudulent when the identified surname and the surname in the extracted personal data are different.

In another embodiment of the present disclosure, at least one group of characters in the identity document number was generated by the soundex coding algorithm. The identity document number is a unique, thirteen-character code that includes the soundex code of the surname of the person associated with the identity document. The soundex code is the first group of characters. A first character in the soundex code represents the first letter of the surname of the person associated with the identity document. The identity document number also includes a group of characters that identify a trusted entity that issued the identity document. Moreover, the identity document number includes a group of characters that represent the birth year of the person associated with the identity document. Furthermore, the identity document number includes a group of characters that represent the birth date and sex of the person associated with the identity document. Additionally, the identity document number includes a last group of characters used to differentiate between people with similar personal data.

In yet another embodiment of the present disclosure images of identity documents for individuals are stored in a database. The method further includes the step of comparing the identified surname against a surname in each stored identity document image to identify candidate identity documents. Each candidate identity document includes a same or different version of the surname, is associated with a different person and includes facial image data of the different person. Moreover, the method includes the steps of comparing the facial image data from the received image against the facial image data from each candidate identity document image, calculating a matching score for each comparison, and determining the identity document is authentic when a highest matching score satisfies a threshold score.

In yet another embodiment of the present disclosure, the identity document was issued by a trusted entity and the trusted entity assigned the identity document number to the identity document. The method further includes the steps of comparing the extracted identity document number against the identity document number assigned to the identity document, and determining the identity document is authentic when the extracted and assigned identity document numbers match.

In another embodiment of the present disclosure images of identity documents for individuals are stored in a database, and the step of determining the authenticity of the identity document further includes comparing the identified surname against a surname in each stored identity document image to identify candidate identity documents. Each candidate identity document image is associated with a different person and includes facial image data of the different person. Moreover, the step of determining the authenticity of the identity document further includes comparing the extracted personal data against corresponding personal data in each candidate identity document image, comparing the facial image data from the captured identity document image against the facial image data in each candidate identity document image, and calculating a matching score for each facial image data comparison. Furthermore, the step of determining the authenticity of the identity document further includes determining the identity document is authentic when the extracted personal data matches the corresponding personal data in one of the candidate identity document images, and the highest matching score is generated from the comparison using the one candidate identity document image.

In another embodiment of the present disclosure, data records for the person associated with the identity document are stored in a database of data records and the determining the authenticity of the identity document step further includes identifying data records for the person having a different version of the surname in the extracted personal data using the soundex coding algorithm. Moreover, the determining the authenticity of the identity document step includes comparing a birth date in the extracted personal data against a birth date in each identified data record and determining the identity document is authentic when the birth date in one of the identified data records matches the birth date in the extracted personal data.

Another aspect of the present disclosure provides an electronic device for determining the authenticity of an identity document that includes a processor and a memory configured to store data. The electronic device is associated with a network and the memory is in communication with the processor and has instructions stored thereon which, when read and executed by the processor, cause the electronic device to receive an image of an identity document. The identity document image includes facial image data and personal data of a person associated with the identity document and an identity document number. Moreover, the instructions when executed by the processor cause the electronic device to extract the personal data and the identity document number from the identity document image.

The extracted personal data includes at least a surname and the extracted identity document number includes groups of characters that represent different items of personal data and information about an entity. Furthermore, the instructions when executed by the processor cause the electronic device to decode a first group of the characters using a soundex coding algorithm, identify a surname that corresponds to the decoded first group of characters, compare the identified surname against the surname in the extracted personal data, and determine the authenticity of the identity document using a result of the comparison.

In one embodiment of the present disclosure, the instructions when read and executed by the processor further cause the electronic device to calculate a matching score based on the comparison, compare the matching score against a threshold score, and when the matching score satisfies the threshold score, determine the identity document is authentic.

In another embodiment of the present disclosure, the extracted personal data includes the birth date of the person associated with the identity document and the instructions when read and executed by the processor further cause the electronic device to decode at least one other group of characters in the extracted identity document number to determine a decoded birth date, compare the birth date from the extracted personal data against the decoded birth date, determine the identity document is authentic when the birth dates match, and determine the identity document is fraudulent when the birth dates are different.

In yet another embodiment of the present disclosure, the identity document was issued by a trusted entity and the instructions when read and executed by the processor further cause the electronic device to decode another group of characters in the extracted identity document number to determine a decoded entity, compare the decoded entity against the trusted entity, determine the document is authentic when the decoded and trusted entities match, and determine the document is fraudulent when the decoded and trusted entities are different.

In another embodiment of the present disclosure the instructions when read and executed by the processor further cause the electronic device to determine the identity document is authentic when the identified surname matches the surname in the extracted personal data, and determine the identity document is fraudulent when the identified surname and the surname in the extracted personal data are different.

In another embodiment of the present disclosure, at least one group of characters in the identity document number is generated by the soundex coding algorithm. The identity document number is a unique, thirteen-character code that includes the soundex code of the surname of the person associated with the identity document. The soundex code is the first group of characters. A first character in the soundex code represents the first letter of the surname of the person associated with the identity document. The identity document number also includes a group of characters that identify a trusted entity that issued the identity document. Moreover, the identity document number includes a group of characters that represent the birth year of the person associated with the identity document. Furthermore, the identity document number includes a group of characters that represent the birth date and sex of the person associated with the identity document. Additionally, the identity document number includes a last group of characters used to differentiate between people with similar personal data.

In another embodiment of the present disclosure images of identity documents for individuals are stored in a database and the instructions when read and executed by the processor further cause the electronic device to compare the identified surname against a surname in each stored identity document image to identify candidate identity documents. Each candidate identity document includes a same or different version of the surname, is associated with a different person, and includes facial image data of the different person. Moreover, the instructions when read and executed by the processor further cause the electronic device to compare the facial image data from the received image against the facial image data from each candidate identity document image, calculate a matching score for each comparison, and determine the identity document is authentic when a highest matching score satisfies a threshold score.

In another embodiment of the present disclosure the identity document was issued by a trusted entity and the trusted entity assigned the identity document number to the identity document. The instructions when read and executed by the processor further cause the electronic device to compare the extracted identity document number against the identity document number assigned to the identity document, and determine the identity document is authentic when the extracted and assigned identity document numbers match.

In another embodiment of the present disclosure images of identity documents for individuals are stored in a database and the instructions when read and executed by the processor further cause the electronic device to compare the identified surname against a surname in each stored identity document image to identify candidate identity documents. Each candidate identity document image is associated with a different person and includes facial image data of the different person.

Moreover, the instructions when read and executed by the processor further cause the electronic device to compare the extracted personal data against corresponding personal data in each candidate identity document image, compare the facial image data from the captured identity document image against the facial image data in each candidate identity document image, and calculate a matching score for each facial image data comparison. Furthermore, the instructions when read and executed by the processor further cause the electronic device to determine the identity document is authentic when the extracted personal data matches the corresponding personal data in one of the candidate identity document images, and the highest matching score is generated from the comparison using the one candidate identity document image.

In yet another embodiment of the present disclosure data records for the person associated with the identity document are stored in a database of data records and the instructions when read and executed by the processor further cause the electronic device to identify data records having a different version of the surname in the extracted personal data using the soundex coding algorithm. Moreover, the instructions when read and executed by the processor cause the electronic device to compare a birth date in the extracted personal data against a birth date in each identified data record and determine the identity document is authentic when the birth date in one of the identified data records matches the birth date in the extracted personal data.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
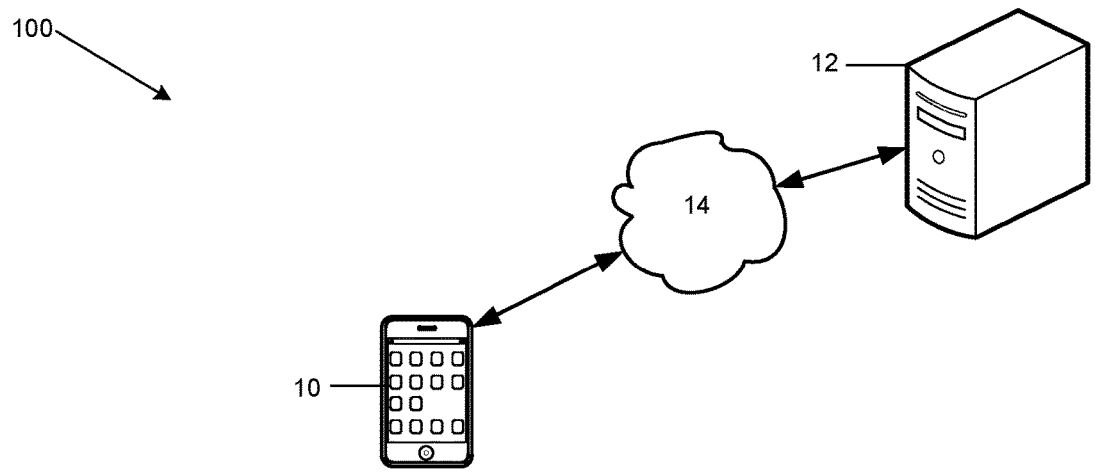
FIG. 1 is a schematic diagram of an example computing system for determining the authenticity of an identity document according to an embodiment of the present disclosure.

FIG. 1 is a schematic diagram of an example computing system 100 for determining the authenticity of an identity document according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, receiving data from other electronic devices (not shown) in the system 100, and otherwise performing any and all functions, methods and/or algorithms described herein by any computer, computer system, server or electronic device that may be included in the system 100. Examples of the electronic device 10 include, but are not limited to, a cellular phone, any wireless hand-held consumer electronic device, a smart phone, a tablet computer, a phablet computer, a laptop computer, and a personal computer (PC). The electronic device 10 may also be any type of server or computer implemented as a network server or network computer. The electronic device 10 may be stationary or portable.

The electronic device 10 is typically associated with one person who operates the device 10. The person who is associated with and operates the electronic device 10 is referred to herein as a user.

The server 12 can be, for example, any type of server or computer implemented as a network server or network computer. The server 12 may be capable of at least downloading applications over the Internet, running applications, capturing and storing data temporarily and/or permanently, receiving data from other electronic devices (not shown) in the system 100, and otherwise performing any and all functions, methods and/or algorithms described herein by any computer, computer system, server or electronic device that may be included in the system 100.

The server 12 is an electronic device so may be alternatively referred to as an electronic device. Additionally, the electronic device 10 and the server 12 may each be considered an information system so may alternatively be referred to as an information system.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
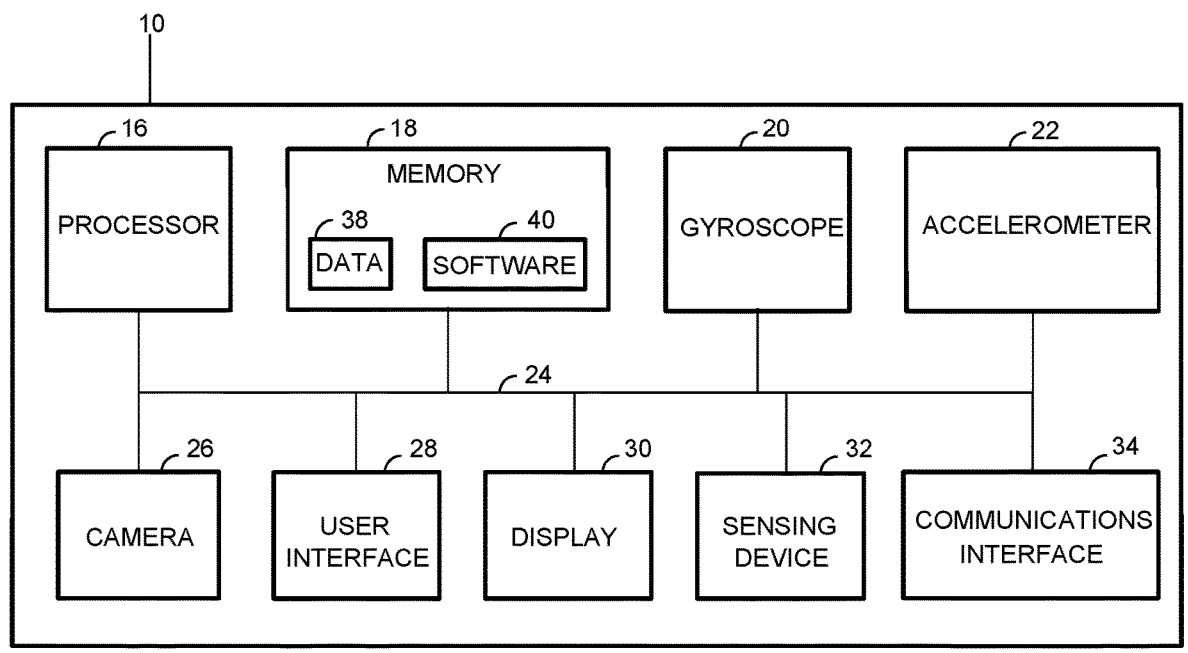
FIG. 2 is a schematic diagram of an example electronic device included in the system shown in FIG. 1.

FIG. 2 is a more detailed schematic diagram of the electronic device 10 for determining the authenticity of an identity document according to an embodiment of the present disclosure. The computing device 10 includes components such as, but not limited to, one or more processors 16, a memory 18, a gyroscope 20, an accelerometer 22, a bus 24, a camera 26, a user interface 28, a display 30, a sensing device 32, and a communications interface 34. General communication between the components in the computing device 10 is provided via the bus 24.

The electronic device 10 can be any electronic device capable of at least downloading applications over the Internet, running applications, capturing and storing data temporarily and/or permanently, and otherwise performing any and all functions described herein by any computer, computer system, server or electronic device. Examples of the electronic device 10 include, but are not limited to, a cellular phone, any wireless hand-held consumer electronic device, a smart phone, a tablet computer, a phablet computer, a laptop computer, and a personal computer (PC). The electronic device 10 may also be any type of server or computer implemented as a network server or network computer. The electronic device 10 may be stationary or portable.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 38, for example, data records of users and a database of images in which each image is of an identity document. Each data record is typically for a respective user. The data record for each user may include data such as, but not limited to, the user's personal data and images of identity documents associated with the user. Identity documents include, but are not limited to, passports, driver's licenses, and identity cards.

The term "personal data" as used herein includes any demographic information regarding a user as well as contact information pertinent to the user. Such demographic information includes, but is not limited to, a user's surname, age, date of birth, street address, email address, citizenship, marital status, and contact information. Contact information can include devices and methods for contacting the user.

Additionally, the memory 18 can be used to store any type of software 40. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, computer programs that analyze and determine the authenticity of identity documents, computer programs that implement soundex coding and/or decoding algorithms, phonetic coding algorithms, string matching algorithms, computer programs that implement coding and/or decoding based on personal data or any other data, and any other software and/or any type of instructions associated with algorithms, processes, or operations for controlling the general functions and operations of the electronic device 10. The software may also include computer programs that implement buffers and use RAM to store temporary data.

The gyroscope 20 and the one or more accelerometers 22 generate data regarding rotation and translation of the electronic device 10 that may be communicated to the processor 16 and the memory 18 via the bus 24. Stationary electronic devices 10 may not include the gyroscope 20 or the accelerometer 22 or may not include either.

The camera 26 captures image data. As used herein, capture means to record data temporarily or permanently, for example, image data of identity documents. The camera 26 can be one or more imaging devices configured to record image data of identity documents of a user while utilizing the electronic device 10. Moreover, the camera 26 is capable of recording image data under any lighting conditions including infrared light. The camera 26 may be integrated into the electronic device 10 as one or more front-facing cameras and/or one or more rear facing cameras that each incorporates a sensor, for example and without limitation, a CCD or CMOS sensor. Alternatively, the camera 26 can be external to the electronic device 10. Image data of identity documents includes at least images of the documents.

The camera 26 may transmit captured image data to any other computer, computer system, server, or electronic device (not shown) in the system 100. When the camera is integrated into the electronic device 10, the camera 26 may transmit captured image data to the processor 16 and the memory via the bus 24. The processor 16 and memory 20 are considered electronic devices.

The user interface 28 and the display 30 allow interaction between a user and the electronic device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a camera, a keyboard, a mouse, an illuminator, a signal emitter, a microphone, and/or speakers.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed or user entered information can be captured and stored in the memory 20.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), Zigbee communication protocol, infrared, or other similar capabilities. Communications between the electronic device 10 and other devices (not shown) may occur via NFC, RFID, Bluetooth, Zigbee communication protocol, or the like only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet™ or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across a network between the electronic device 10 and any other device (not shown). The exchange of information may involve the transmission of radio frequency (RF) signals through an antenna (not shown).

Figure 3:
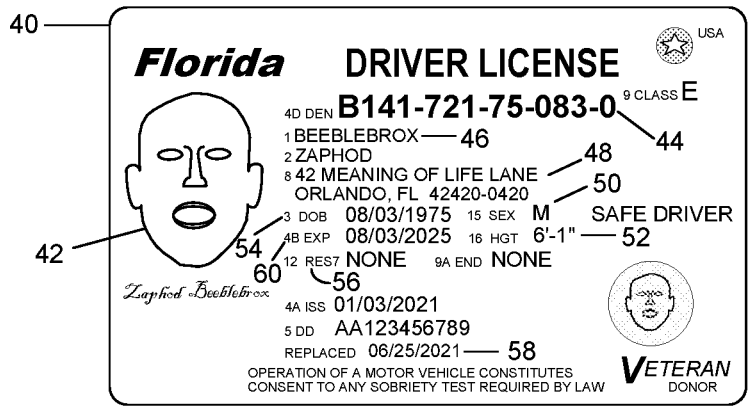
FIG. 3 is a diagram illustrating an image of an example identity document.

FIG. 3 is a diagram illustrating an image of an example identity document 40. A first side of the identity document 40 is shown. The example identity document 40 is a driver's license issued by the state of Florida. However, it is contemplated by the present disclosure that the identity document 40 may alternatively be any identity document used to prove a claim of identity, for example, a passport or an identification card. A trusted entity typically generates and issues the identity documents. For example, a driver's license may be generated and issued by a state Department of Motor Vehicles while a passport may be generated and issued by the State Department of a country. Governmental entities are generally considered trusted entities. The image may be captured with the electronic device 10 or any other device included in the system 100 capable of communicating with the server 12 via the network 14.

The identity document 40 includes an image 42 of the person to whom the identity document was issued and has a fine line, duplex and microtext background. The person to whom the identity document was issued is also the person associated with the identity document. The identity document 40 also includes other information such as, but not limited to, an example identity document number 44, the person's name 46, address 48, sex 50, height 52, and date of birth 54. Additionally, the identity document 40 includes restrictions 56 the person is required to comply with while driving, the replacement date 58, and the expiration date 60. Any textual information included on the first side of the identity document 40 may be extracted from the image using optical character recognition (OCR) techniques. The identity document number 44 as described herein is a driver's license number. However, the identity document number 44 may alternatively be any number appropriate for a same or different type of identity document, for example, a passport number for a passport that can be used for determining the authenticity of an identity document as described herein.

The example identity document number 44 is B141-721-75-083-0, which includes thirteen characters. The thirteen characters are separated into five different groups. The first group of characters, B141, is the soundex coding of the person's surname. Soundex is the name given to a system for coding and indexing family names based on a phonetic spelling of the last name. The soundex is a coded surname index based on the way a surname sounds instead of the way it is spelled. Surnames that sound the same but have different spellings have the same soundex code, for example, Rodriguez and Rodriques. Rodriguez and Rodriques are different versions of the same surname. The soundex code includes a letter and three numbers. The letter is always the first letter of the surname while numbers are assigned to other letters in the surname according to the soundex coding system. The surname of the person to whom the identity document 40 was issued is Beeblebrox. The Soundex coding for Beeblebrox is B141.

The example second group of characters is 721. The second group is a three-character code that corresponds to the trusted entity that generated and issued the identity document 40. For the example identity document 40 described herein, the trusted entity may be a state Department of Motor Vehicles. The trusted entity typically assigns the identity document numbers to the identity documents. The example third group of characters is 75. The third group is a two-character code representing the birth year of the person to whom the identity document 40 was issued. The example fourth group of characters is 083. The fourth group is a three-character code that represents the birthday and sex of the person to whom the identity document 40 was issued. The last character, 0, is used for differentiating between people who have the same or similar personal data.

Although the example identity document number 44 as described herein includes thirteen characters separated into five groups of characters, it is contemplated that in other embodiments the identity document may include any number of characters and that the characters may be divided into any number of groups. Moreover, it is contemplated that in other embodiments each group may include any number of characters. Characters may be letters, numbers, or any combination of letters and numbers.

It is contemplated by the present disclosure that the identity document number 44 may be used to facilitate determining whether an identity document 40 is authentic or fraudulent. More specifically, information extracted from the identity document number 44 may compared against corresponding information extracted from the identity document to facilitate determining whether an identity document may be authentic or fraudulent.

For example, the soundex coding system may be used to decode or extract the person's surname from the first group of characters in the identity document number 44. The decoded surname should begin with the letter "B" and represent a phonetic spelling of "Beeblebrox", for example, "Beeblebrocks" or "Bblbrocks". The decoded surname may be any phonetic variant of the actual surname "Beeblebrox." The other groups of characters may also be decoded to determine if the information encoded therein matches corresponding information on the identity document 40. For example, the decoded second group of characters should match the trusted entity that issued the identity document 40, the decoded third group of characters should match the person's year of birth, the decoded fourth group of characters should match the person's birthday and sex, while the decoded last character should match the corresponding information. When each item of decoded data matches the corresponding data shown on the identity document 40, the identity document 40 may be considered authentic. However, when the decoded data of at least one group does not satisfactorily match the corresponding data, the identity document may be considered fraudulent.

Any one group or combination of groups of characters in the identity document number 44 may be used to determine the authenticity of the identity document 44. For example, the second and third groups may be used.

It is contemplated by the present disclosure that when the decoded data of at least one group of characters does not satisfactorily match the corresponding data, the identity document 40 may be authenticated using additional authentication techniques. For example, the identity document 40 may be authenticated by comparing the entire identity document number 44 against the entire identity document number in other identity document images in a database of identity document images. When the numbers match the identity document 40 may be authentic. Otherwise, the identity document may be fraudulent.

Another alternative authentication technique may include comparing data extracted from the identity document number 44 against corresponding information extracted from the identity document numbers of identity document images in the database. Alternatively, or additionally, data extracted from the identity document 44 may be compared against the corresponding information extracted from text in the identity document images in the database. As the number of matches between corresponding items of data increases, the accuracy and trustworthiness of the identity document 40 authentication result also increases.

Figure 4:
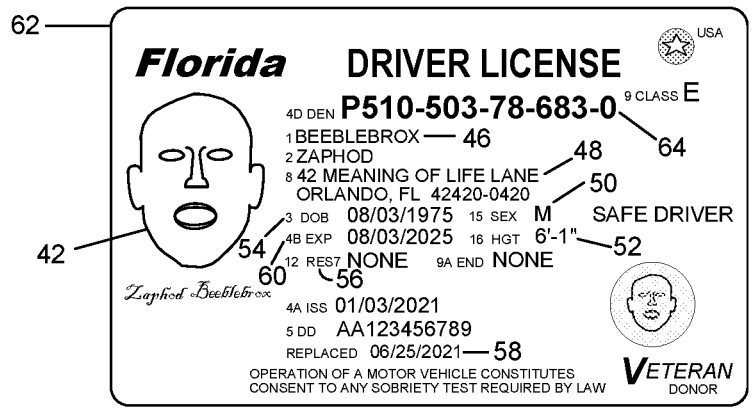
FIG. 4 is a diagram illustrating another example identity document similar to the document illustrated in FIG. 3, including a different identity document number.

The information shown in FIG. 4 is the same information shown in FIG. 3 as described in more detail below. As such, features illustrated in FIG. 4 that are identical to features illustrated in FIG. 3 are identified using the same reference numerals used in FIG. 3.

FIG. 4 is a diagram illustrating another example identity document 62 similar to the identity document as shown in FIG. 3; however, the identity document 62 includes an example identity document number 64 different than the identity document number 44. The example identity document 62 includes the same personal data as the identity document 40 and has the same fine line, duplex and microtext background. Additionally, the identity document number 64 includes thirteen characters separated into five groups of characters. Thus, the identity document 62 appears authentic. However, the identity document number 64 is different than the document number 44. The identity document number 64 is P510-503-78-683-0.

The first group of characters in the identity document number 64 is P510. Decoding the first group of characters using the soundex coding system indicates that it corresponds to a surname that begins with the letter "P", followed by either an "m" or "n", which is followed by a "b", "f" "p", or "v". Surnames that may correspond to these letters include, but are not limited to, Pompey, Phaneuf, Pompa, Pompei, Pombo, and Pannhoff Decoding the second and third groups of characters yields a birth date of May 23, 1978 and that the identity document 62 was issued to a female. Thus, it can be seen that the surname does not match the surname "Beeblebrox" as indicated on the identity document 62, the May 23, 1978 birthdate does not match the birthdate indicated on the identity document 62, and the sex does not match the sex indicated on the identity document 62. As a result, it can be seen that the identity document 62 is fraudulent and that analyzing information extracted from the identity document number 64 facilitates determining whether the identity document 62 is authentic or fraudulent.

Service providers typically require individuals to upload an image of his or her identity document, like a driver's license or a passport, and a claim of identity to facilitate accurate and trustworthy authentication results. The uploaded images are typically analyzed to determine whether the identity document in the uploaded image is authentic. Imposters have been known to impersonate individuals by providing a false claim of identity supported by fraudulent identity documents when attempting to deceive a service provider into concluding the imposter is the person he or she claims to be. Such impersonations are known as spoofing. It is known that some states append check digits to driver's license numbers to protect against spoofing.

Impostors also have been known to use many methods to obtain or create fraudulent identity documents. For example, imposters have been known to alter identity documents by laminating another person's image onto their own identity document or to change the text of another person's identity document, for instance, the driver's license number. The imposters upload images of the altered documents, for example, when attempting to open a bank account. Such fraudulent identity documents are difficult to detect using known techniques. Consequently, opening a banking account or other type of similar account with an uploaded image of an identity document captured at a remote location depends on verifying the identity document in the uploaded image is authentic.

Methods for automatically determining the authenticity of an identity document included in an image are known to analyze various features of the document. For example, such methods are known to analyze the text font to verify it comports with the appropriate standards for the respective class of document, determine whether security features are present, determine whether the color spectrum of the document is proper, and verify that the uploaded image was not taken of a photocopy. However, these methods typically do not generate results that satisfy desired accuracy and trustworthiness requirements, are expensive, and can result in compromised security.

To address these problems an electronic device can receive an image of an identity document, which includes facial image data and personal data of a person associated with the identity document and an identity document number. The personal data and the identity document number can be extracted from the identity document image. The extracted personal data can include at least a surname. The extracted identity document number can include groups of characters that represent different items of personal data and information about an entity.

A first group of the characters can be decoded using a soundex coding algorithm and a surname can be identified that corresponds to the decoded first group of characters. The identified surname can be compared against the surname in the extracted personal data, and the authenticity of the identity document can be determined using the result of the comparison.

Figure 5:
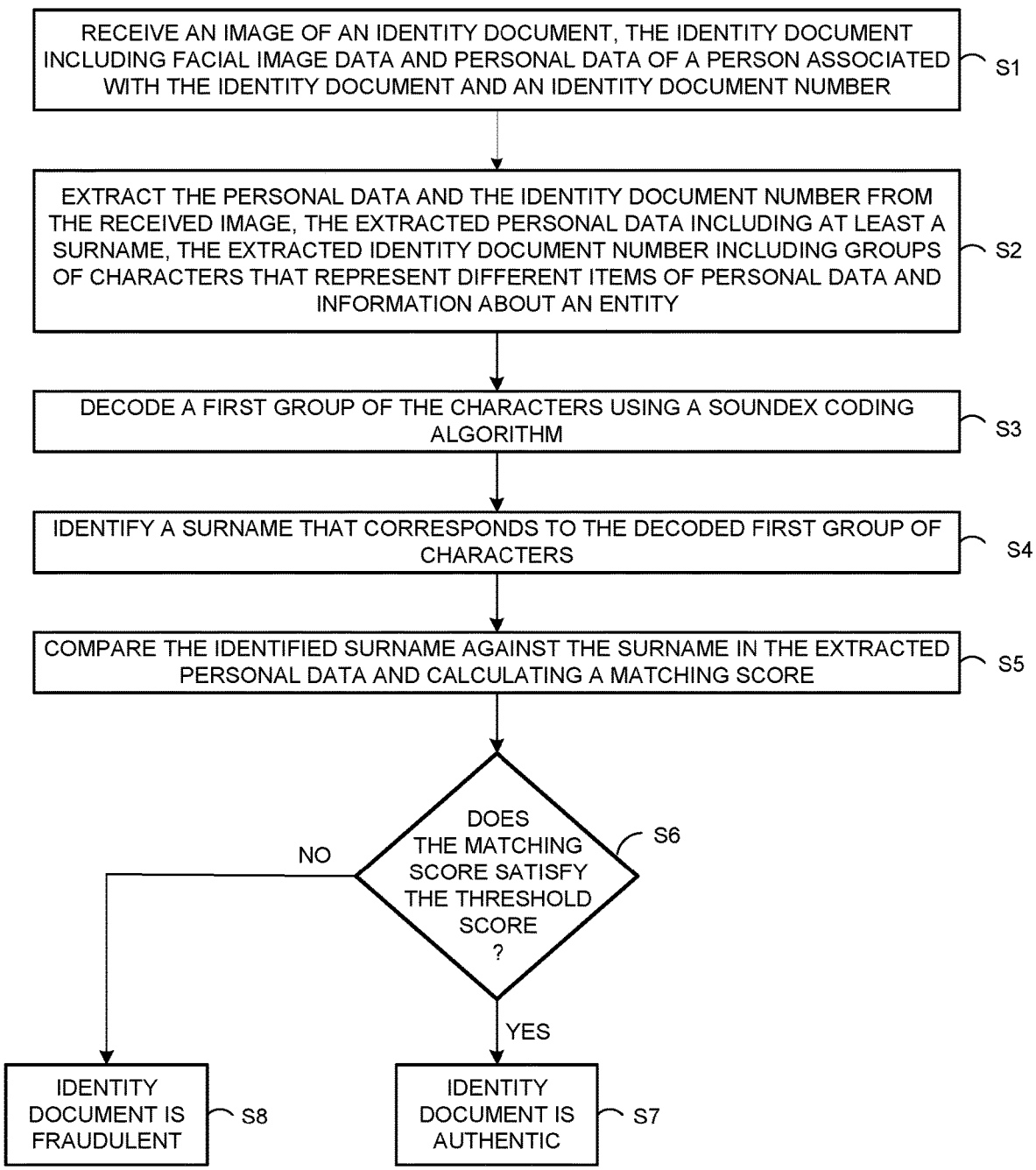
FIG. 5 is a flowchart illustrating an example method and algorithm for determining the authenticity of an identity document according to an embodiment of the present disclosure.

FIG. 5 is a flowchart illustrating an example method and algorithm for determining the authenticity of an identity document according to an embodiment of the present disclosure. For this example method and algorithm, the identity document is considered to have been issued by a trusted entity. FIG. 5 illustrates example steps performed when the electronic device 10 runs software 38 stored in the memory 18 to determine the authenticity of an identity document.

In step S1, the software 38 executed by the processor 16 causes the electronic device 10 to receive an image of an identity document 40. The identity document image includes facial image data and personal data of a person associated with the identity document 40 and an identity document number 44. In step S2, the software 38 executed by the processor 16 causes the electronic device 10 to extract the personal data and the identity document number 44 from the identity document image. The extracted personal data includes at least a surname. The extracted identity document number 44 includes groups of characters that represent different items of personal data and information about an entity.

Next, in step S3, the software 38 executed by the processor 16 causes the electronic device 10 to decode a first group of the characters using a soundex coding algorithm and, in step S4, to identify a surname that corresponds to the decoded first group of characters. In step S5, the software 38 executed by the processor 16 causes the electronic device 10 to compare the identified surname against the surname in the extracted personal data and to calculate a matching score for the comparison. The authenticity of the identity document is determined based on the result of the comparison.

More specifically, in step S5, the software 38 executed by the processor 16 causes the electronic device 10 to compare the matching score against a threshold score and, in step S6, determine if the matching score satisfies the threshold value. When the matching score satisfies the threshold value, in step S7, the identity document 40 may be authentic. However, when the matching score does not satisfy the threshold value, in step S8, the identity document 40 may be fraudulent.

The threshold value may be satisfied when a calculated matching score is less than or equal to the threshold value. Other threshold values may be satisfied when the calculated matching score is equal to or greater than the threshold value. Alternatively, the threshold value may include multiple threshold values, each of which is required to be satisfied to satisfy the threshold value.

Although the identity document 40 may be authentic when the matching score satisfies the threshold value, the authenticity of the identity document 40 may alternatively be determined without calculating a matching score and without comparing the matching score against the threshold value. For example, the identified surname may be compared against the surname in the extracted personal data. If the two surnames match, the identity document 40 may be authentic. However, if the two surnames are different, the identity document 40 may be fraudulent.

Figure 6:
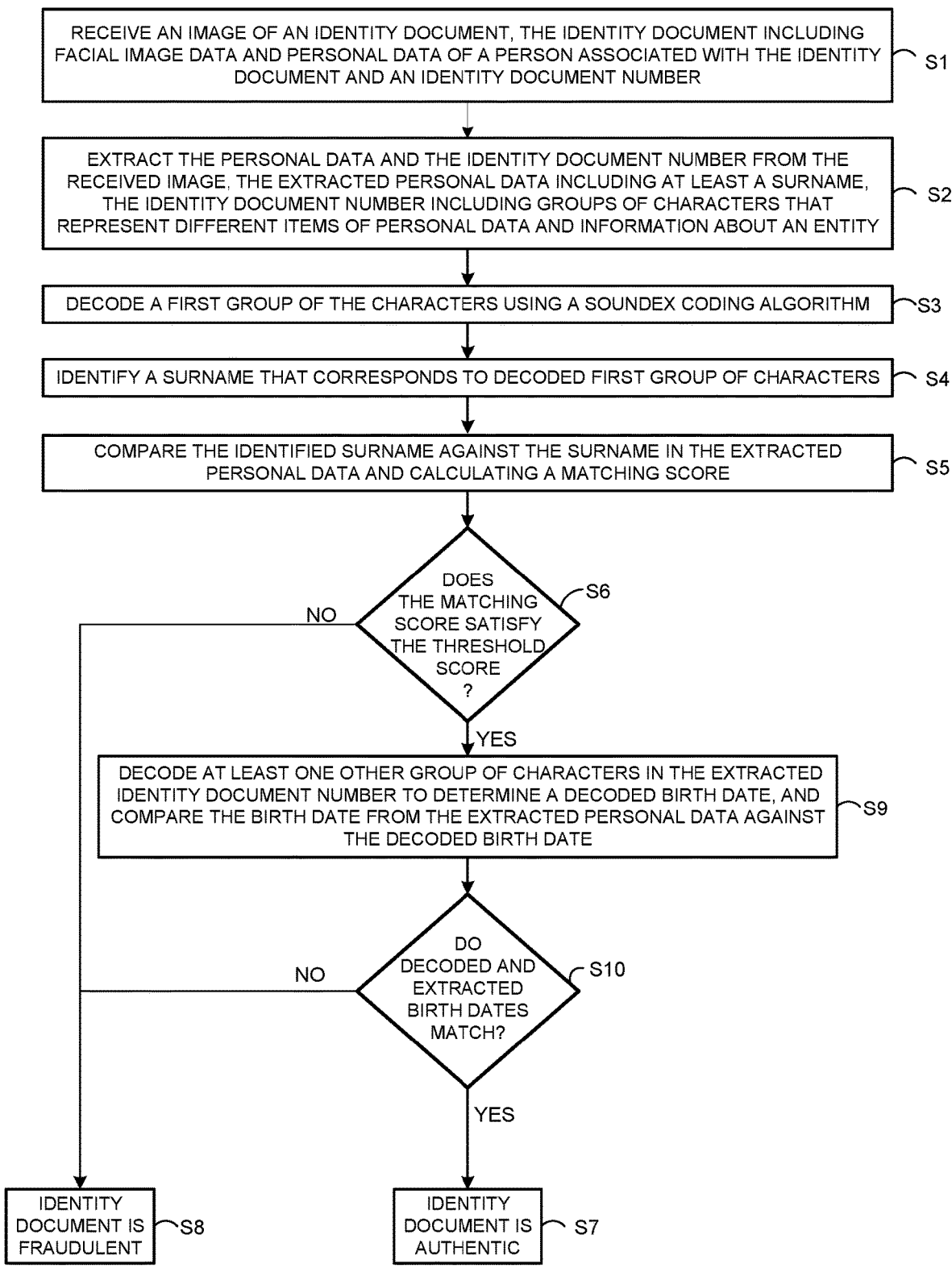
FIG. 6 is a flowchart illustrating another example method and algorithm for determining the authenticity of an identity document according to another embodiment of the present disclosure.

The information shown in FIG. 6 is the same information shown in FIG. 5 as described in more detail below. As such, features illustrated in FIG. 6 that are identical to features illustrated in FIG. 5 are identified using the same reference numerals used in FIG. 5.

FIG. 6 is a flowchart illustrating another example method and algorithm for determining the authenticity of an identity document according to another embodiment of the present disclosure. For this example method and algorithm, the identity document is considered to have been issued by a trusted entity. FIG. 6 illustrates example steps performed when the electronic device 10 runs software 38 stored in the memory 18 to determine the authenticity of an identity document.

This alternative method is similar to that shown in FIG. 5. However, after determining, in step S6, that the matching score satisfies the threshold value, in step S9, the software 38 executed by the processor 16 causes the electronic device 10 to decode at least one other group of characters in the extracted identity document number 44 to determine a decoded birth date. The electronic device 10 also compares the birth date from the extracted personal data against the decoded birth date. Next, in step S10, the software 38 executed by the processor 16 causes the electronic device 10 to determine if the decoded and extracted birthdates match. In step S7, the software 38 executed by the processor 16 causes the electronic device 10 to determine the identity document may be authentic when the birth dates match. In step S8, the software 38 executed by the processor 16 causes the electronic device 10 to determine the identity document may be fraudulent when the birth dates are different.

Figure 7:
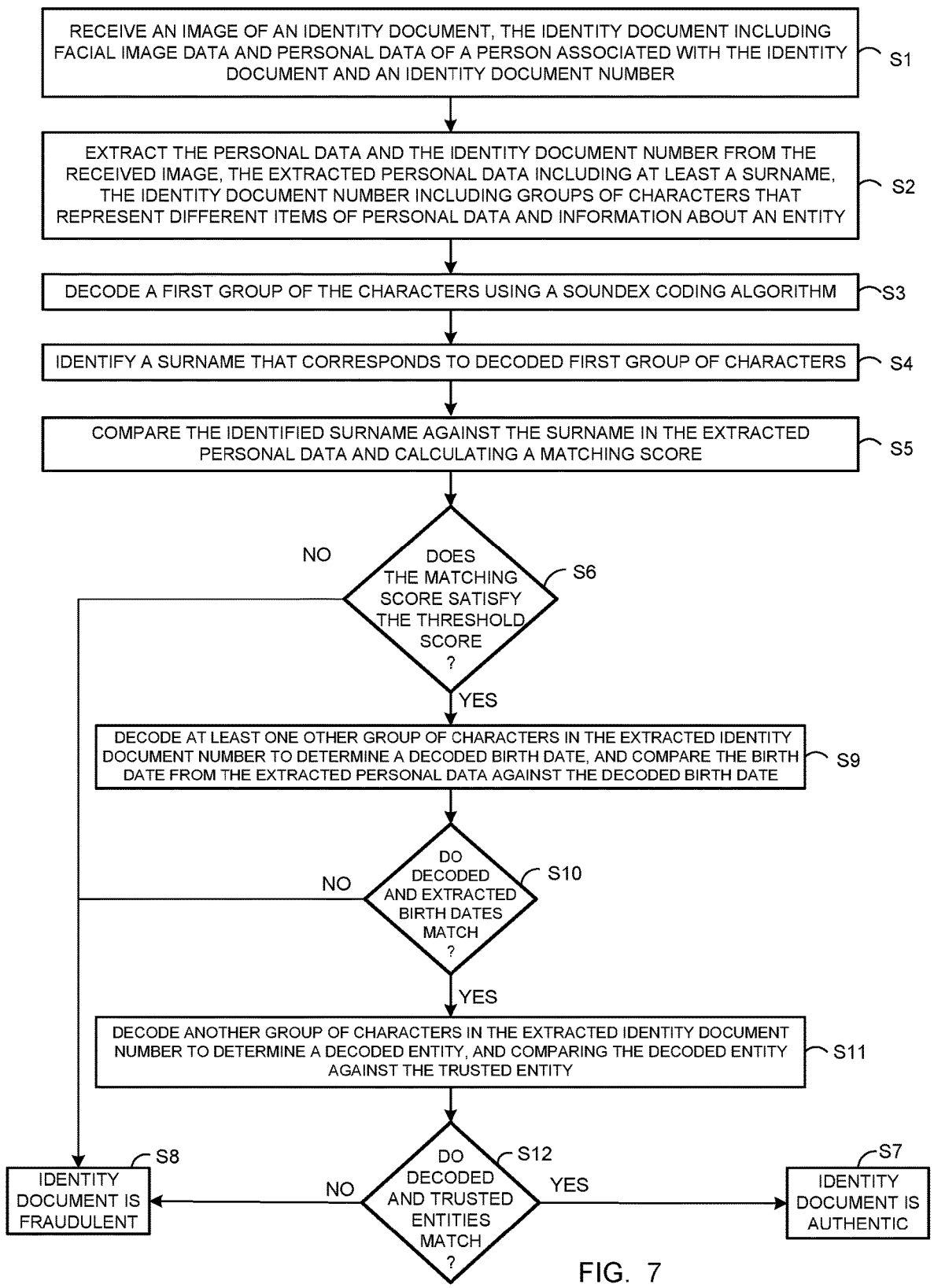
FIG. 7 is a flowchart illustrating yet another example method and algorithm for determining the authenticity of an identity document according to yet another embodiment of the present disclosure.

The information shown in FIG. 7 is the same information shown in FIG. 6 as described in more detail below. As such, features illustrated in FIG. 7 that are identical to features illustrated in FIG. 6 are identified using the same reference numerals used in FIG. 6.

FIG. 7 is a flowchart illustrating yet another example method and algorithm for determining the authenticity of an identity document according to yet another embodiment of the present disclosure. For this example method and algorithm, the identity document is considered to have been issued by a trusted entity. FIG. 7 illustrates example steps performed when the electronic device 10 runs software 38 stored in the memory 18 to determine the authenticity of an identity document 40.

This alternative method is similar to that shown in FIG. 6. However, after determining, in step S10, that the decoded and extracted birth dates match, in step S11, the software 38 executed by the processor 16 causes the electronic device 10 to decode another group of characters in the extracted identity document number 44 to determine a decoded entity, and to compare the decoded entity against the trusted entity. In step S12, the software 38 executed by the processor 16 causes the electronic device 10 to determine if the decoded and trusted entities match. When the decoded and trusted entities match, in step S7, the software 38 executed by the processor 16 causes the electronic device 10 to determine the identity document 40 may be authentic. However, when the decoded and trusted entities are different, in step S8, the software 38 executed by the processor 16 causes the electronic device 10 to determine the identity document may be fraudulent.

The decoded data from some or all of the groups of characters in the extracted identity document number 44 may be used to facilitate authenticating an identity document. The more types of decoded data that matches the corresponding data extracted from the personal data, the more accurate and trustworthy the identity document authentication result. When all of the decoded data matches the corresponding data extracted from the personal data, there is high confidence that the identity document is authentic.

However, it is contemplated by the present disclosure that when the decoded data of at least one group of characters does not satisfactorily match the corresponding data, the identity document 40 may be authenticated using additional authentication techniques. For example, the authenticity of the identity document 40 may be evaluated using biometric authentication techniques. More specifically, the identified surname may be compared against the surname in each identity document image stored in a database of identity document images to identify candidate identity document images. Each of the candidate images includes a same or different version of the identified surname, is associated with a different person than the identity document 40 and includes facial image data of the different person.

The facial image data from the image received in step S1 may be compared against the facial image data from each candidate image. A matching score can be calculated for each comparison. The highest matching score can be compared against a threshold value. If the highest matching score satisfies the threshold value, the identity document may be authentic. Otherwise, the identity document may be fraudulent.

Alternatively, or additionally, the identity document 40 may be deemed authentic when the extracted personal data matches the corresponding personal data in one of the candidate identity document images, and the highest matching score is generated from the comparison using the one candidate identity document image.

In addition to, or as an alternative to, evaluating the authenticity of the identity document 40 using biometric authentication techniques, the authenticity of the identity document 40 may be evaluated based on the identity document number 44 itself. More specifically, the extracted identity document number may be compared against the identity document number assigned to the identity document 40 by the trusted issuing entity. When the extracted and assigned identity document numbers match, the identity document 40 may be authentic. Otherwise, the identity document 40 may be fraudulent. The assigned identity document number may be obtained from a database maintained by the trusted entity that issued the identity document 40.

Using the methods and algorithms for determining the authenticity of an identity document as described herein enables enhancing the accuracy and trustworthiness of identity document authentication results, enhancing security, and facilitating a reduction in costs incurred due to successful spoofing attacks.

It is contemplated by the present disclosure that identity documents may be authenticated using any method and/or algorithm described herein independently, or in any combination that facilitates enhancing the accuracy and trustworthiness of identity document authentication results.

It is contemplated by the present disclosure that the example methods and algorithms described herein may be conducted entirely by the electronic device 10; partly by the electronic device 10 and partly by the server 12; entirely by the server 12; or, by any other combination of other servers (not shown), electronic devices (not shown), or computers (not shown) operable to communicate with the electronic device 10 and the server 12 via the network 14. Furthermore, data described herein as being stored in the electronic device 10 may alternatively, or additionally, be stored in the server 12, any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for determining the authenticity of an identity document comprising the steps of:

receiving, by an electronic device, an image captured of an identity document, the captured identity document image including facial image data and personal data of a person associated with the identity document and an identity document number;

extracting the personal data and the identity document number from the captured identity document image, the extracted personal data including at least a surname, the extracted identity document number including groups of characters that represent different items of personal data and information about an entity;

decoding a first group of the characters using a soundex coding algorithm, the decoded first group of characters representing the phonetic spelling of a second surname;

determining the second surname from the phonetic spelling;

comparing the second surname against the surname in the extracted personal data; and determining the authenticity of the identity document using a result of said comparing step.

2. The method according to claim 1, said determining step comprising:

calculating a matching score based on said comparing step;

comparing the matching score against a threshold score; and when the matching score satisfies the threshold score, determining the identity document is authentic.

3. The method according to claim 2, wherein the extracted personal data comprises the birth date of the person associated with the identity document, said determining step further comprising:

decoding at least one other group of characters in the extracted identity document number to determine a decoded birth date;

comparing the birth date from the extracted personal data against the decoded birth date;

determining the identity document is authentic when the birth dates match; and determining the identity document is fraudulent when the birth dates are different.

4. The method according to claim 3, wherein the identity document was issued by a trusted entity, said determining step further comprising:

decoding another group of characters in the extracted identity document number to determine a decoded entity;

comparing the decoded entity against the trusted entity;

determining the document is authentic when the decoded and trusted entities match; and determining the document is fraudulent when the decoded and trusted entities are different.

5. The method according to claim 1, said determining step further comprising:

determining the identity document is authentic when the second surname matches the surname in the extracted personal data; and determining the identity document is fraudulent when the second surname and the surname in the extracted personal data are different.

6. The method according to claim 1, at least one group of characters in the identity document number being generated by the soundex coding algorithm, the identity document number being a unique, thirteen-character code comprising:

the soundex code of the surname of the person associated with the identity document, the soundex code being the first group of characters, a first character of the soundex code representing the first letter of the surname of the person associated with the identity document;

a group of characters identifying a trusted entity that issued the identity document;

a group of characters representing the birth year of the person associated with the identity document;

a group of characters representing the birth date and sex of the person associated with the identity document; and a last group of characters used to differentiate between people with similar personal data.

7. The method according to claim 1, wherein images of identity documents for individuals are stored in a database, said method further comprising the steps of:

comparing the second surname against a surname in each stored identity document image to identify candidate identity documents, each candidate identity document including a same or different version of the surname, being associated with a different person and including facial image data of the different person;

comparing the facial image data from the received image against the facial image data from each candidate identity document image;

calculating a matching score for each comparison; and determining the identity document is authentic when a highest matching score satisfies a threshold score.

8. The method according to claim 7, the identity document being issued by a trusted entity, the trusted entity assigned the identity document number to the identity document, the method further comprising:

comparing the extracted identity document number against the identity document number assigned to the identity document; and determining the identity document is authentic when the extracted and assigned identity document numbers match.

9. The method according to claim 1, wherein images of identity documents for individuals are stored in a database, said step of determining the authenticity of the identity document further comprising the steps of:

comparing the second surname against a surname in each stored identity document image to identify candidate identity documents, each candidate identity document image being associated with a different person and including facial image data of the different person;

comparing the extracted personal data against corresponding personal data in each candidate identity document image;

comparing the facial image data from the captured identity document image against the facial image data in each candidate identity document image;

calculating a matching score for each facial image data comparison; and determining the identity document is authentic when the extracted personal data matches the corresponding personal data in one of the candidate identity document images, and the highest matching score is generated from the comparison using the one candidate identity document image.

10. The method according to claim 1, wherein data records for the person associated with the identity document are stored in a database of data records, said determining the authenticity of the identity document step further comprising:

identifying data records for the person having a different version of the surname in the extracted personal data using the soundex coding algorithm;

comparing a birth date in the extracted personal data against a birth date in each identified data record; and determining the identity document is authentic when the birth date in one of the identified data records matches the birth date in the extracted personal data.

11. An electronic device for determining authenticity of an identity document comprising:
a processor; and
a memory configured to store data, said electronic device being associated with a network and said memory being in communication with said processor and having instructions stored thereon which, when read and executed by said processor, cause said electronic device to:
receive an image captured of an identity document, the captured identity document image including facial image data and personal data of a person associated with the identity document and an identity document number;
extract the personal data and the identity document number from the captured identity document image, the extracted personal data including at least a surname, the extracted identity document number including groups of characters that represent different items of personal data and information about an entity;
decode a first group of the characters using a soundex coding algorithm, the decoded first group of characters representing the phonetic spelling of a second surname;
determine the second surname from the phonetic spelling;
compare the second surname against the surname in the extracted personal data; and
determine the authenticity of the identity document using a result of the comparison.

12. The electronic device according to claim 11, the instructions when read and executed by said processor further cause said electronic device to:
calculate a matching score based on the comparison;
compare the matching score against a threshold score; and
when the matching score satisfies the threshold score, determine the identity document is authentic.

13. The electronic device according to claim 12, wherein the extracted personal data comprises the birth date of the person associated with the identity document, the instructions when read and executed by said processor further cause said electronic device to:
decode at least one other group of characters in the extracted identity document number to determine a decoded birth date;
compare the birth date from the extracted personal data against the decoded birth date;
determine the identity document is authentic when the birth dates match; and
determine the identity document is fraudulent when the birth dates are different.

14. The electronic device according to claim 13, wherein the identity document was issued by a trusted entity, the instructions when read and executed by said processor further cause said electronic device to:
decode another group of characters in the extracted identity document number to determine a decoded entity;
compare the decoded entity against the trusted entity;
determine the document is authentic when the decoded and trusted entities match; and
determine the document is fraudulent when the decoded and trusted entities are different.

15. The electronic device according to claim 11, wherein the instructions when read and executed by said processor further cause said electronic device to:
determine the identity document is authentic when the second surname matches the surname in the extracted personal data; and
determine the identity document is fraudulent when the second surname and the surname in the extracted personal data are different.

16. The electronic device according to claim 11, at least one group of characters in the identity document number being generated by the soundex coding algorithm, the identity document number being a unique, thirteen-character code comprising:
the soundex code of the surname of the person associated with the identity document, the soundex code being the first group of characters, a first character of the soundex code representing the first letter of the surname of the person associated with the identity document;
a group of characters identifying a trusted entity that issued the identity document;
a group of characters representing the birth year of the person associated with the identity document;
a group of characters representing the birth date and sex of the person associated with the identity document; and
a last group of characters used to differentiate between people with similar personal data.

17. The electronic device according to claim 11, wherein images of identity documents for individuals are stored in a database and the instructions when read and executed by said processor further cause said electronic device to:
compare the second surname against a surname in each stored identity document image to identify candidate identity documents, each candidate identity document including a same or different version of the surname, being associated with a different person and including facial image data of the different person;
compare the facial image data from the received image against the facial image data from each candidate identity document image;
calculate a matching score for each comparison; and
determine the identity document is authentic when a highest matching score satisfies a threshold score.

18. The electronic device according to claim 17, wherein the identity document was issued by a trusted entity and the trusted entity assigned the identity document number to the identity document, the instructions when read and executed by said processor further cause said electronic device to:
compare the extracted identity document number against the identity document number assigned to the identity document; and
determine the identity document is authentic when the extracted and assigned identity document numbers match.

19. The electronic device according to claim 11, wherein images of identity documents for individuals are stored in a database and the instructions when read and executed by said processor further cause said electronic device to:
compare the second surname against a surname in each stored identity document image to identify candidate identity documents, each candidate identity document image being associated with a different person and including facial image data of the different person;
compare the extracted personal data against corresponding personal data in each candidate identity document image;
compare the facial image data from the captured identity document image against the facial image data in each candidate identity document image;

calculate a matching score for each facial image data comparison; and determine the identity document is authentic when the extracted personal data matches the corresponding personal data in one of the candidate identity document images, and the highest matching score is generated from the comparison using the one candidate identity document image.

20. The method according to claim 11, wherein data records for the person associated with the identity document are stored in a database of data records and the instructions when read and executed by said processor further cause said electronic device to:

identify data records having a different version of the surname in the extracted personal data using the soundex coding algorithm;

compare a birth date in the extracted personal data against a birth date in each identified data record; and determine the identity document is authentic when the birth date in one of the identified data records matches the birth date in the extracted personal data.

\* \* \* \* \*